United States Patent [19]

Pedersen et al.

[11] Patent Number: 5,447,731
[45] Date of Patent: Sep. 5, 1995

[54] PROCESS AND AN APPARATUS FOR THE PREPARATION OF CHEESE

[75] Inventors: Poul J. Pedersen, Thiseː; Erik E. Pedersen, Videbᵏk; Niels K. Ottosen, Resenbro; Niels Osterland, Sorring, all of Denmark

[73] Assignee: APV Pasilac A/S, Aarhus, Denmark

[21] Appl. No.: 142,375

[22] PCT Filed: May 20, 1992

[86] PCT No.: PCT/DK92/00163
§ 371 Date: Nov. 22, 1993
§ 102(e) Date: Nov. 22, 1993

[87] PCT Pub. No.: WO92/20216
PCT Pub. Date: Nov. 26, 1992

[30] Foreign Application Priority Data

May 21, 1991 [DK] Denmark .................................. 954/91

[51] Int. Cl.⁶ ........................................... A23C 19/05
[52] U.S. Cl. ............................................. 426/36; 426/40
[58] Field of Search ..................................... 426/40, 36

[56] References Cited

U.S. PATENT DOCUMENTS

| | | |
|---|---|---|
| 4,205,090 | 5/1980 | Maubois et al. |
| 4,243,684 | 1/1981 | Pruss et al. |
| 4,355,048 | 10/1982 | Schaap et al. |
| 4,401,679 | 8/1983 | Rubin et al. |
| 4,766,003 | 8/1988 | Skovhauge et al. |
| 4,965,078 | 10/1990 | Van Leeuwen et al. ............. 426/40 |

FOREIGN PATENT DOCUMENTS

| | | |
|---|---|---|
| 0484728A1 | 5/1992 | European Pat. Off. |
| 390787 | 1/1973 | Sweden. |
| 2101866 | 1/1983 | United Kingdom. |
| 2105167 | 3/1983 | United Kingdom. |

OTHER PUBLICATIONS

"Low-Fat Semi-Hard Cheese From Ultrafiltrated Milk", Nordeuropaeisk Mejeri Tidsskrift No. Mar. 1980, pp. 52–61.

"Experiments on Making Saint-Paulin by Full Concentration of Milk with Ultrafiltration", Milchwissenschaft 42(4) 1987, pp. 222–225.

"Utilization of the New Mineral UF-Membranes for Making Semi-Hard Cheeses", Desalination, 35 (1980), pp. 243–258.

"Elements De Fabricaton De Fromages A Pate Demi-Dure Et A Ouverture Propionique Selon Le Procede MMV", P. Ducruet et al., La Technique Laitiere No. 967–Sep. 1981, pp. 13–16.

Primary Examiner—Joseph Golian
Attorney, Agent, or Firm—Lowe, Price, LeBlanc & Becker

[57] ABSTRACT

A process and an apparatus for the production of cheese on the basis of milk or milk products where after pasteurizing and partially cooling the material, said material is subjected to membrane filtration, further cooling, dosing of rennet and starter and optionally other additives, mixing and casting followed by after-treatment and curing, whereby the membrane filtration is carried out to obtain a retentate with a dry matter content of x % by weight, wherein x is between $38+\frac{1}{3}(y-20)$ and $44+\frac{1}{3}(y-20)$ and wherein y is the fat content in % by weight calculated in relation to the dry matter content, whereby the retentate is subjected to heat treatment, whereupon the material is cooled to a temperature not higher than 40° C. before dosing the rennet and the starter and whereby the viscosity of the material is kept below 60,000 cP when starting the dosing. By the process an interesting new type of cheese having a high quality and being reasonably priced is obtained.

7 Claims, 1 Drawing Sheet

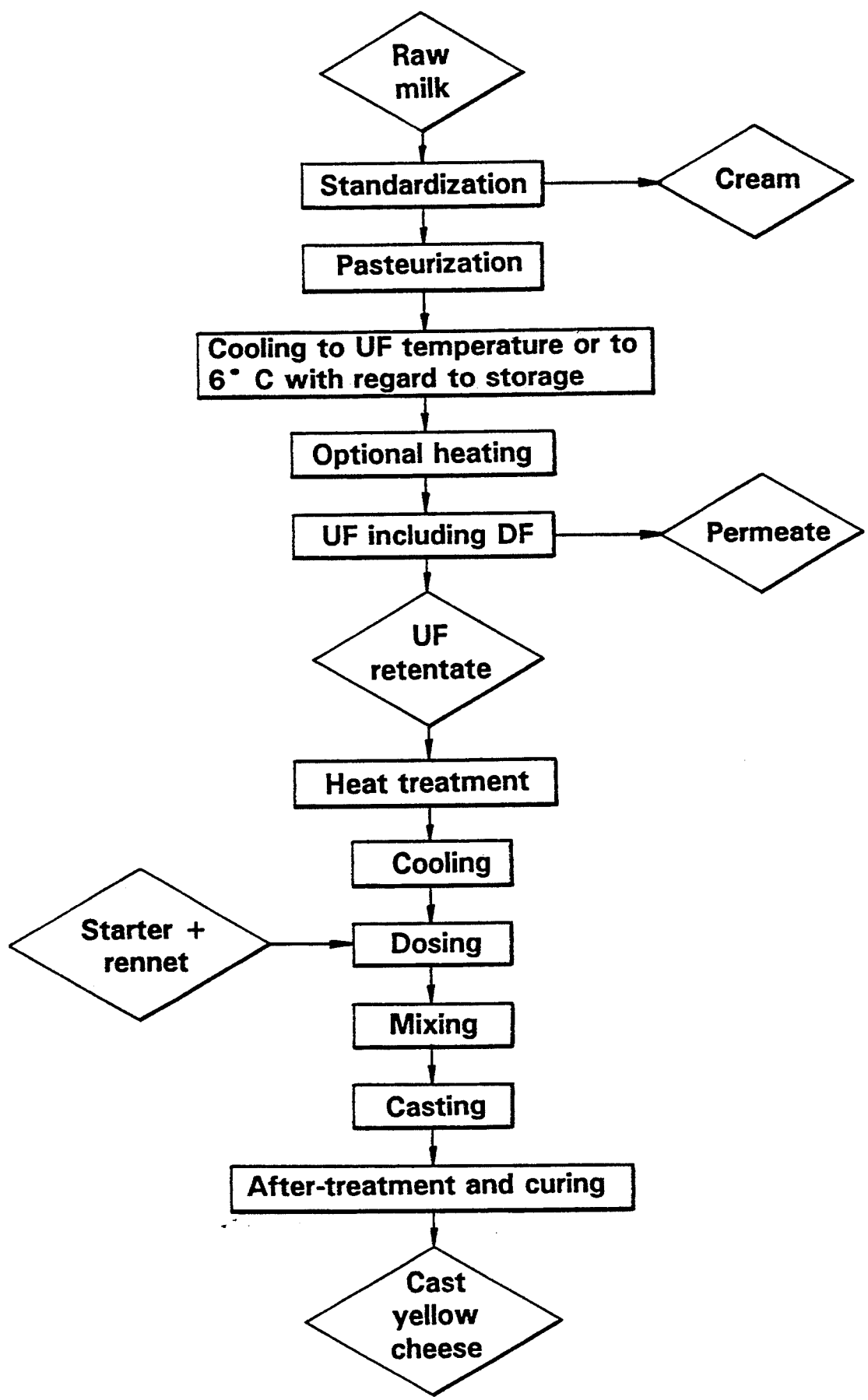

PROCESS AND AN APPARATUS FOR THE PREPARATION OF CHEESE

TECHNICAL FIELD

The present invention relates to a process for the preparation of cheese on the basis of milk or milk products where after pasteurizing and partially cooling the material, said material is subjected to membrane filtration, further cooling, dosing of rennet and starter and optionally other additives, mixing and casting, again followed by after-treatment and curing, as well as an apparatus to be used when carrying out the process.

The invention relates to an improved process of preparing so-called "cast" cheese, where milk or a milk product is firstly concentrated by membrane filtration, whereupon the actual cheese making process is carried out by adding rennet and starter.

BACKGROUND ART

The preparation of cast cheese has been known since 1969, cf. for instance U.S. Pat. No. 4,205,090 (Maubois et al.). In principle, this process is characterized by separating the milk product in to a filtrate (permeate) and a liquid retentate by membrane filtration, such as ultrafiltration (UF). Apart from casein, the retentate also retains water-soluble proteins, i.e. the so-called whey proteins comprising globulin and albumin, while lactose and non-protein nitrogen compounds (NPN) remain in the permeate. The retentate has substantially the same dry matter content as the finished cheese. To make cheese the retentate is processed by adding cheese rennet and starter, whereupon the resulting product is cast into cheese molds, brine salted and cured.

Examples of developments of the above process of preparing cast cheese include the technique disclosed in GB patent application no. 2.105.167 (Qvist et al.), and SE published accepted application no. 390.787 (Maubois et al.). None of the processes disclosed in the above specifications uses a filtration retentate having a dry matter concentration in the range of approx. 38% by weight or above. The retentates according to the examples of the above specifications have a dry matter content of approx. 30% by weight and 20% by weight, respectively.

GB patent specification no. 2.101.866 (Rubin et al.) discloses a process for preparing a so-called cheese-base by ultrafiltration combined with diafiltration (DF) of milk followed by evaporation. The retentate is inoculated with a starter prior to and subsequent to evaporation. The process is used to prepare a raw material suitable for the preparation of processed cheese. However, the process is unsuitable for the preparation of classical, semi-hard cheese.

The known process according to the above U.S. Pat. No. 4,205,090 (Maubois et al.) is widely used for the preparation of cheese having a comparatively low dry matter content. The process has, for instance, been commercially successful when preparing feta-cheese. The process has, however, been useless for the preparation of so-called semi-hard yellow cheese. By semi-hard yellow cheese is meant a semi-hard cheese having a dry matter content of at least 38% by weight in the case of a 20+ cheese (i.e. a cheese where the fat makes up 20% by weight of the total dry matter content) or at least 41.3, 46.3 or 48% by weight, respectively in the case of 30+, 45+ or 50+ cheese. A reason why the known method has not previously been usable for the preparation of a semi-hard yellow cheese is that a retentate of membrane filtration having a higher dry matter content becomes very viscous when cooled to temperatures below 40° C. As a result, the subsequent addition of starter and rennet is difficult to carry out satisfactorily. The admixing is often insufficient resulting in unacceptable products, as coagulation is not uniform. As a result, areas of excess coagulation are formed and thereby a risk that so-called onion rings are formed. This means that the cheese does not cohere and tends to split. Furthermore, this results in undesired whey separation, thus wasting valuable proteins in the whey. The high viscosity further results in an increased load on the plant used and causes great pressure losses.

It is known that to avoid unwanted growth of microorganisms it is desirable to carry out a heat treatment as late as possible. It would thus be most desirable to carry out heat treatment immediately prior to adding starter and rennet. However, when subjecting the retentate to heat treatment, this may result in a further increase in viscosity and thus enhance the above problems associated with increased viscosity. Furthermore, persons skilled in the art have generally been of the opinion that such heat treatment of the retentate might have a destructive effect on the quality of the cheese and result in a bitter cheese.

Furthermore, a large number of articles have been published relating to the preparation of cheese by membrane filtration. R. de Boer and P.F.C. Nooy of Niederländisches Institut für Milchwirtschaftliche Forschungen, Ede, Netherlands: "Low-fat semi-hard chees from ultrafiltered milk", Nordeurop isk Mejeritidsskrift, no. 3/1980, discloses the preparation of semi-hard cheese by ultrafiltration. In the article the two authors mention the viscosity of skimmed milk concentrates of high protein content. "Studies on the viscosity of such concentrates having a protein content of up to about 20% point to a pseudoplastic behaviour. This pseudoplastic behaviour is largely influenced by the rate of shear. . . " (the paragraph bridging page 58 and page 59). The article discusses the problems connected with viscosity during the preparation of cheese by ultrafiltration of skimmed milk followed by evaporation. It is mentioned that for a protein content of 31% a proper control of the temperature in the scraped-surface evaporator is necessary to avoid gelation. When cooling to renneting temperature the viscosity increases. It has been found that at certain rates of shear the influence of the decrease in temperature on the viscosity is only limited. Thus a satisfactory mixing of rennet and starter concentrate can be carried out by sufficiently high rate of shear. This process is complicated, as highly concentrated cream is added later and two thus viscous production lines are thus involved, one with skimmed milk and one with highly concentrated cream. This among other things results in a more complicated control of the process. Furthermore, when working with the highly concentrated cream, i.e. cream with 70–80% by weight of fat there is a risk of the phases of the emulsion inverting (from oil-in-water to water-in-oil), whereby butter is produced.

U.S. Pat No. 4,355,048 (Schaap et al.) discloses the preparation of semi-hard cheese, such as Gouda and Edam, by ultrafiltering skimmed milk to obtain a retentate having a dry matter content of at least 31.5%, such as in the range of from 31.7 to 32.4%. The retentate is then mixed with fat, such a milk fat, and rennet and starter are added, whereupon the resulting material is cast, pressed, salted and cured in a conventional manner. Prior to casting, a dry matter content of 38% by weight for a 20+ cheese and of 48% by weight for a 50+ cheese is obtained due to the addition of fat. In the disclosed process, the high dry matter contents are thus obtained by subsequent addition of fat and, a retentate having the final dry matter content is thus not prepared by ultrafiltration. Also here, two highly viscous production lines are involved. Furthermore, no heat treatment of the retentate is carried out.

The article by R. Delbeke of Government Dairy Research Station, Melle, Belgium: "Experiments on making Saint-Paulin by full concentration of milk with ultrafiltration", Milchwissenschaft 42 (4) 1987, p. 222–225, discloses experiments relating to the preparation of Saint-Paulin cheese by ultrafiltration of milk to obtain a retentate having an average dry matter content of 46%, whereof 21% are protein and 21% fat. The retentate resulted in a cheese having a dry matter content of 50% after 4 weeks without whey drainage. In particular, the article points to the influence of various parameters of the process on the final product, especially calcium content, pH-value, buffer capacity, lactose and ash content, pre-acidification and sodium chloride treatment. At the relatively low dry matter content (46%) for a fat content of about 45% of the dry matter combined with an addition of 0.5% sodium chloride, this method conventionally does not result in problems of viscosity. It is of course also a contributory factor that the retentate is not subjected to heat treatment. The process requires acidification in a tank and can therfor hardly be carried out continuously.

The article by H. Goudéranche, J. L. Maubois et al.: "Utilization of the new mineral UF-membranes for making semi-hard cheeses", Desalination, 35 (1980), pp. 234–258, discloses the preparation of semi-hard cheese, such as Saint-Paulin, having a protein content of 21% and a dry matter content of 45% by membrane filtration. The process is based on the use of an inorganic UF-membrane. Fat-standardized milk is ultrafiltered and diafiltered to a protein content of approx. 21% and a dry matter content of approx. 45%. The retentate is then cooled to 30° C. and either conventional or freeze-dried starter is added. At a pH-value of approx 5.2 first 1.0% sodium chloride and then rennet is added in an amount of approx. 40 ml each 100 kg retentate. In this process the problems associated with the viscosity may more easily be overcome because of the pH-decrease and the addition of salt. However, the above process requires a period in a tank in order to ensure the process of acidification. The above is thus a rather complicated process which can hardly be carried out continuously.

P. Ducruet, J.-L. Maubois, H Goudedranche and R. Pannetier, "Elements de fabrication de fromages à pâte demi-dure et à ouverture propionique selon le procéde MMV", La Technique Laitiére No. 957, September 1981, pages 13–16 discloses a further development of the above technique according to Goudedranche et al., where the addition of salt is, however, not used. The dry matter content of the retentate is 45–47% by weight. No heat treatment of the retentate is carried out and to ensure a sufficiently low viscosity, the renneting is carried out at 40°–45° C., which requires the employment of particular thermophilic starter cultures. Furthermore, Ducruet uses pre-acidification, the starters being added 30 minutes before the rennet. This makes it difficult to carry out the process continuously.

In order to avoid the drawbacks of the highly concentrated retentates subjected to heat treatment, it has been attempted to admix starter and rennet at elevated temperatures, such as 42° C., thus decreasing the viscosity. Such elevated temperatures, however, prevent the use of conventional starter cultures, for which reason one has to resort to special, thermophilic cultures. These special cultures usually result in an atypical taste and structure of the finished cheese, which is not desirable in some types of ripened cheese.

It has also been attempted to increase the amount of starter and rennet mixture by adding more water. This measure was equally unsuitable, since it diluted the product. If it is thus desired to obtain a finished cheese with a predetermined dry matter content it is necessary to carry out membrane filtration to an increased dry matter content. Consequently the membrane filtration capacity has to be increased, and the obtained retentate has an increased viscosity as a result of the increased dry matter content.

It has surprisingly been found that; it is possible to prepare cast cheese having a dry matter content corresponding to the one of conventional semi-hard cheese, i.e. cheese prepared by firstly coagulating the milk, followed by separating the whey by use of conventional rennet and conventional starters without the above problems, thereby obtaining a cheese of good quality, taste and consistency. To this should be added that it has even been found to be possible to subject the retentate from the membrane filtration to heat treatment immediately prior to the admixture (dosing) of rennet and starter, without encountering problems of increased viscosity.

BRIEF SUMMARY OF THE INVENTION

The invention thus relates to a process and an apparatus for the preparation of cheese on the basis of milk or milk products where after pasteurizing and partially cooling the material, said material is subjected to membrane filtration, further cooling, dosing of rennet and starter and optionally other additives, mixing and casting followed by after-treatment and curing, said process being characterised in that membrane filtration is carried out to obtain a retentate with a dry matter content of x % by weight, where x is between $38 + \frac{1}{3} (y-20)$ and $44 + \frac{1}{3} (y-20)$ and where y is the fat content in % by weight calculated in relation to the dry matter content, that the retentate is subjected to heat treatment at 64°–70° C. for 10–40 seconds, that the material is cooled to a temperature not higher than 40° C. before dosing the rennet and the starter and optionally other additives and that the process is carried out under such conditions as to time and the shear force that the viscosity of the material is not more than 60,000 cP when starting the dosing.

The present invention is surprising in that the problems connected with working with a high dry matter content and heat treatment of the retentate, are avoided. A particular problem now avoided is the uncontrollable increase in viscosity of the retentate in the course of the process from membrane filtration to dosing of rennet and starter culture. Particularly when left to stand, protein-rich retentates develop a structure such that the viscosity increases. This is avoided by carrying out the process under such conditions as to time and shear force that at the start of the dosing the viscosity of the material is not more than 60,000 cP measured at a shear rate of $D = 12$ sec$^{-1}$ and 35° C. Apart from the advantages of working with a high dry matter content and with a heat treatment of the retentate, the present invention is further advantageous in that it is no longer necessary to maintain a temperature of above 40° C. during the addition (dosing) of rennet and starter and the subsequent mixing. As a result, it is not necessary to resort to special, atypical, thermophilic starter cultures. It is possible to use conventional starter cultures like the ones used in the preparation of classical, semi-hard ,cheese. This is one of the prerequisites for the finished cheese having the good consistency and taste valued by consumers.

It must be characterized as very surprising that the late heat treatment advantageous per se does not have a detrimental effect on the quality of the cheese, as the opinion among persons skilled in the art has been that such heat treatment of the retentate might destroy the quality and make the cheese bitter. The cheese made by the process according to the invention has been found to be of an unusually good quality as to the consistency and taste which is not directly comparable to the known cheese products. A new attractive type of cheese has thus been obtained.

It is also an advantage to keep the lapse of time from the dosing to the casting on around 30 seconds, for instance between 20 and 40 seconds.

To avoid unnecessary increase in the viscosity, the process from the end of the membrane filtration to the dosing may advantageously be carried out under conditions where the material is in constant movement.

By the process according to the invention is is advantageous to carry out the process from the end of the membrane filtration to the casting continuously to avoid unnecessary increase in the viscosity and to ensure a smooth course of the process.

The invention also relates to an apparatus to be used when carrying out the process according to the invention, said apparatus comprising units for preceding pasteurization and partial cooling and units for subsequent after-treatment and curing. According to the invention, the apparatus is characterised in that it comprises a) an ultrafiltration unit with associated diafiltration unit, to which a positive pump has been connected to one or more of the last loops,
b) a retentate feeding pump,
c) a heat treatment and cooling unit,
d) a dosing means for continuous admixing of starter and rennet and other optional additives, and
e) a mixing device.

The retentate feeding pump may advantageously be a positive pump functioning as a regulating means to regulate the dry matter content of the retentate.

To prevent the retentate from depositing on the walls of the heat treatment and cooling unit, the unit advantageously comprises a scraped surface heat exchanger system.

To ensure a good uniform distribution of rennet and starter in the retentate flow, the dosing means is advantageously formed in such a manner that it comprises a pipeline for retentate flow and an inlet opening for a dosing flow of starter and rennet, which opens up substantially in the middle of the retentate flow.

It is particularly advantageous if the the inlet opening is formed to allow inlet of the dosing flow in the same direction as (downstream) the retentate flow. In practice, such design has been found to provide the best homogenous mixture between the two flows.

In an advantageous embodiment, the mixing means is a static or dynamic mixing means.

The further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The process according to the invention is described in greater detail below with reference to the drawing which comprises one FIGURE showing a block diagram illustrating the preparation of cast, yellow cheese.

DETAILED DESCRIPTION

By the process according to the invention it is possible to work with a retentate having a considerably higher dry matter content than the ultrafiltration retentates previously used. The practical limits to the dry matter content depend on the fat content, as a higher fat content in the dry matter makes it possible to keep a higher total dry matter content. The lower limit for the dry matter content is conventionally dictated by the desire to obtain a suitable hardness, for instance allowing the cheese to be sliced. The upper limit is dictated by practical considerations, as an excessively high dry matter content may mean a risk of viscosity problems and thereby problems ensuring a reasonable ultrafiltration capacity, a sufficient heat treatment and a homogenous admixture of rennet and starter.

For a 20+ cheese (i.e. a cheese having 20% fat based on the total dry matter content) the lower limit for the dry matter content of the retentate is 38%, preferably 39%, such as 40%. In practice, the upper limit is around 44% by weight, preferably 42% by weight, such as 41% by weight.

For a 30+ cheese the dry matter content should be at least 41.3% by weight, preferably at least 42% by weight, such as at least 43% by weight and not more than 47.3% by weight, preferably not more than 46% by weight, such as not more than 44% by weight.

For a 45+ cheese the dry matter content should be at least 46.3% by weight, preferably at least 47% by weight, such as at least 48% by weight and not more than 52.3% by weight, preferably not more than 50% by weight, such as not more than 49% by weight.

Finally, the dry matter content for a 50+ cheese should be at least 48% by weight, preferably at least 49% by weight, such as at least 50% by weight, and not more than 54% by weight, preferably not more than 52% by weight, such as not more than 51% by weight.

The dry matter content of the retentate obtained by the membrane filtration may advantageously be regulated by using a positive pump as retentate feeding pump. The power necessary to maintain the desired flow in the individual recirculation loops of the ultrafiltration apparatus is directly dependent on the dry matter content. The measuring signal for the power in kW from the pump(s) in the last loop(s) may thus be used as regulation signal to regulate the speed of the feeding pump to the heat treatment and cooling unit.

It is an essential feature of the present invention that the process from the end of the membrane filtration to the casting takes place within a relatively short period of time, so that a too high viscosity is not built up. It will thus be an advantage to work continuously and not to use buffer containers during this part of the process. If, after all, it is necessary to use a detention or "stand-by" period, it is important that the retentate is kept in motion, the retentate having a thixotropic nature. Of course, the thixotropic viscosity structure may be destroyed by means of shear force, whereby the retentate get the desired low viscosity immediately before the dosing of rennet and starter. As, strictly theoretically, it is thus not absolutely necessary to carry out the process from the end of the membrane filtration and to immediately before the dosing of rennet and starter continuously, it must be understood that it is of course most practical also to carry out this part of the process continuously.

It is also an essential feature of the present invention that the retentate is subjected to a heat treatment and subsequent cooling immediately before the dosing of rennet and starter. Such heat treatment carried out as late as possible during the process reduces the risk of unwanted growth of bacteria. The heat treatment is carried out by heating to 64°–70° C., such as around 69° C. for 10–40 seconds, such as 20 seconds. The heat treatment is conventionally carried out in a scraped surface heat exchanger system, where the heat exchanger system is used both for heating and for the subsequent cooling of the material to a renneting temperature of not more than 40° C.

Before the addition of rennet and starter, the retentate must have a viscosity of not more than 60,000 cP measured at a shear rate of $D=12$ sec$^{-1}$ and a temperature of 35° C. The viscosity measurements are carried out using Rheomat 30, Contraves.

After the admixture of rennet and starter, it is an essential feature of the present invention that only short time passes prior to the casting, and therefore the process is conventionally controlled in such a manner that this period lasts between 20 and 40 seconds, such as between 25 and 35 seconds, especially around 30 seconds.

To ensure the short period between the dosing and the casting, the casting may be carried out with two or more pouring stubs, thereby avoiding stopping the flow.

Examples of usable starter cultures to be used when carrying out the process according to the invention include mesophilic acidifiers, e.g. the BD culture B-11 mixed with the O culture R-603. These starter cultures are available from Chr. Hansens Laboratorium, Hersholm, Denmark. Different mesophilic aroma cultures may advantageously be used together with the starter culture.

A standard rennet, also available from Chr. Hansens Laboratorium, having a rennetability of 1:15,000 or a corresponding rennet may be used as rennet. Rennetability designates the number of liters of milk which 1 liter of rennet is able to coagulate in 40 minutes at 35° C.

It is important that the dosing of rennet and starter in the retentate takes place in such a manner that rennet and starter are evenly distributed quickly. This is advantageously carried out by guiding the dosing flow of rennet and starter through an inlet opening into a pipeline for the retentate flow, the inlet opening being placed in the middle of the retentate flow. The inlet opening may be directed opposite the retentate flow (upstream) but in practice this has been found to result in a bad mixing, as the relatively low-viscous dosing flow is pressed against the sides of the retentate flow and is thus not mixed completely therein. Therefore, it is conventionally advantageous to place the inlet opening in such a manner that the dosing flow is introduced in the same direction as the retentate flow (downstream), whereby it spreads out to the sides more uniformly and is mixed with the retentate flow on the way.

The subsequent mixing means may be a conventional dynamic mixing means, i.e. in the form of e.g. a set of propeller stirrers introduced into the flow. However, it is also possible to use a so-called static mixing means, i.e. a piece of tube with baffle plates forcing the flow to deflect sufficiently for the flow to be thoroughly mixed.

The process according to the invention may be carried out using milk or milk products with a pH value of between and 6.8, however preferably between pH 6.5 and 6.7. In the case of low fat cheese, such as 20+ and 30+, problems of protein gelation may arise in connection with heat treatment of the retentate at pH values below 6.5, as such retentates has a relatively high protein content. By such types of cheese, pH should thus be kept over 6.5, whereas, as mentioned, it is possible to go down to around pH=6.3 in case of a higher fat content.

Raw milk or one or more fractions of raw milk including reconstituted dry milk is used as starting material. The starting material is firstly standardized to ensure that the starting material is uniform and has the desired fat content dependent on the type of cheese desired. When using raw milk as starting material, cream is usually separated during standardization. The standardized milk is pasteurized in a conventional manner by heating to 70°–75° C., preferably 72° C. for a period, usually approx. 15 seconds, adequate to ensure sufficient germ reduction. The pasteurized mixture is cooled to below 10° C., usually about 6° C. if the pasteurized milk is to be stored. The milk is reheated to a temperature of approx. 45°–55° C., preferably 50° C., whereupon it is subjected to membrane filtration. It is also possible to cool to the membrane filtration temperature after the pasteurization and to carry out membrane filtration without intervening storage.

Membrane filtration is carried out by continuous ultrafiltration (UF) with diafiltration (DF) to obtain a retentate having a dry matter content substantially corresponding to the desired dry matter content of the finished cheese. The amount of lactose is reduced by diafiltration, said amount being adjusted to a predetermined value which ensures that sufficient lactose is available to the starter culture during the curing and ripening of the cheese, for instance approx. 0.8–1.9% by weight of lactose. The optimum lactose level depends on the type of cheese desired. In case of a low fat content and thereby relatively higher protein content, a relatively high lactose level must be used. The lactose content for a 45+ cheese is conventionally around 1.1%, whereas for a 20+ cheese, the lactose content is conventionally around 1.6%.

The retentate obtained by membrane filtration is subjected to heat treatment, where the retentate is heated to 64°–70° C., especially 65°–69° C., such as about 69° C. for 10–30 seconds, preferably approx. 20 seconds, whereupon it is immediately cooled to a temperature not higher than 40° C., preferably not higher than 35° C., such as about 31° C., whereupon rennet and starter culture are still continuously and quickly admixed under vigorous agitation.

A heat treatment of the above extent is assumed to correspond to low pasteurization, which is defined as a heat treatment where the alkaline phosphatase enzyme of the milk is inactivated.

The dosing takes place in the form of a dosing flow which is introduced through an inlet opening preferably opening into the middle of the pipeline through which the retentate flow is running. The dosing flow is preferably introduced downstream the retentate flow, i.e. in the same direction as the retentate flow, thereby avoiding the relatively low viscous dosing flow to be pressed against the sides of the pipeline without being sufficiently mixed into the retentate. The rennet and the starter culture are introduced as an aqueous suspension in a volume of 1–1.5% of the volume of the retentate flow.

After the dosing, the flow passes a mixing means. The mixing means may be a static or a dynamic mixing means. A static mixing means may consist of a piece of tube with baffle plates, said baffle plates deflecting and thereby mixing the flow as it passes. Examples of dynamic mixing means include such where one or more rotating stirring means, for instance propeller stirrers, are placed in the flow.

It is essential that the course of the process from the end of the membrane filtration to the dosing of rennet and starter is carried out under such conditions that no essential viscosity change takes place in the retentate which would make difficult the dosing and the mixing and would yield an unsatisfactory unhomogenous product. In the present invention it is thus an advantage if, contrary to what has so far been normal practice, no buffer containers are used between the individual step is of the process. The period of time passing between the end of the membrane filtration and the dosing of rennet and starter should thus be kept as short as possible. If tile apparatus used is formed in such a manner that the retentate is kept under vigorous agitation, it is, however, possible to retard the increase in viscosity, in which case the time span may be somewhat longer.

Under all circumstances, the viscosity of the retentate should not have increased to more than 60,000 cP when the rennet and starter culture are dosed. The retentate being thixotropic, it is possible to reduce the viscosity by means of shear force.

Following the mixing, the material is cast, for instance by automatic filling of molds. It is an essential feature of the process according to the invention that the process from the dosing to the casting takes place continuously and quickly as the viscosity of the material starts to increase irreversibly after the dosing.

After the material has been filled into molds, the process may proceed in the following manner. Following the casting, the molds are left to stand for 3–10 hours, such as 4 hours. The cast, uncured cheeses are demolded and acidified and brine salted on acidification and brining shelves. The cheeses are then left to stand for at least 10 hours, whereupon they are again brine salted and left to ripen.

The invention is illustrated further below by means of the following examples.

EXAMPLE 1

In connection with the present invention numerous continuous test runs have been carried out using a pilot plant with a capacity of 250 kg of precheese per hour. Today, industrial process plants are conventionally dimensioned for 1000 or 2000 kg precheese per hour.

The dry matter content obtainable in the finished cheese especially depends on the desired fat content and on the ripening method. The fat content, calculated as the percentage of fat in relation to the dry matter content, may vary from less than 10% to 50% or higher if required. The relevant ripening method may be surface ripening or ripening as rindless cheese.

As a guideline to the relation between fat content and dry matter content in the finished cheese, it may be mentioned that a 45+ yellow, cast ultrafiltered cheese conventionally contains 48–49% of dry matter as fresh cheese, before brining and ripening. In conventional surface ripening, the dry matter content of a 5 weeks old 45+ cheese is typically 52–53%. Rindless 45+ cheese typically contains 50–51% dry matter.

The individual steps of the production process appear from the FIGURE.

Pre-treatment of milk

The production process is initiated by fat standardization of the milk in relation to the protein content of the milk, taking into account the desired fat content of the cheese and the fact that all whey proteins act as cheese proteins in the process according to the invention. This again is due to the fact that the whey proteins are retained in the membrane filtration retentate during the membrane filtration process.

The standardized milk is then pasteurized at 72° C. for 15 seconds like traditional cheese milk and is cooled either to the membrane filtration temperature of 50° C., if the milk is pumped directly to the membrane filtration apparatus, or to 6° C., if it is to be stored before further processing.

Concentration by ultrafiltration

After being preheated to 50° C. for 5 minutes, if the milk has been cooled, the pasteurized cheese milk enters the ultrafiltration apparatus to be continuously concentrated up to a dry matter content corresponding to a semi-hard fresh cheese, for instance 49% dry matter for a 45+ cheese.

The ultrafiltration process, going on at 50° C., is not only a milk fat and protein concentration process. It is also a process in which the lactose content of the ultrafiltration retentate is reduced by diafiltration and standardized to a predetermined level, whereby no lactose is left in the fresh cheese after fermentation to the correct fresh cheese pH level of 5.2.

Treatment of ultrafiltration retentate

After full concentration, the highly viscous retentate is continuously led out of the ultrafiltration apparatus by means of a positive pump and is pumped through a system of scraped surface heat exchangers for a heat treatment and is cooled to fermentation and renneting temperature. By the heat treatment, the retentate is heated to 69° C. ($\pm\frac{1}{2}$° C.) for about 20 seconds, whereupon it is immediately cooled to 31° C. The temperature/time relationship is essential to the further processing of the retentate.

Cheesemaking

After pasteurization and cooling to renneting temperature, the necessary additives, starter culture and rennet as well as optionally nitrate, calcium chloride color salt and ripening enzymes are in-line dosed and the additives are mixed into the retentate. Immediately after mixing, the material is led to a specially constructed mold filling system in which the material is continuously filled into molds, e.g. made of plastic material.

After renneting, the molds are automatically transported to a mold stacking system in which the cheeses are stored for some hours at room temperature in order to cure before demolding. The demolding procedure takes place automatically and the cheeses are also automatically placed on a shelf system where they are kept until they have completed acidification.

The fermentation process, taking place in the mold and on the shelf system, takes less than 15 hours in spite of the high buffer capacity in the precheese, whereupon the pH is 5.2. A combination of mesophilic DVS starters (20 g B-11 and 20 g R-603 per 100 kg retentate, available from Chr. Hansens Laboratorium) is used to obtain the desired fermentation process. For the coagulation, a standard rennet (rennetability 1:15,000, 20 ml per 100 kg retentate, Chr. Hansens Laboratorium) is added. In principle, the brining and ripening conditions are the same as in conventional cheesemaking.

Brining may start even earlier than 15 hours after renneting, because the cheese may be placed in the brine already when the pH is 5.6-5.8. This will not affect the quality of the cheese.

The ripening conditions as regards temperature, humidity and surface treatment correspond to those of conventional treatment.

Cheese quality

It must be emphasized that a yellow, cast cheese is not a traditional semi-hard cheese, as 20% of the proteins are whey proteins which are not present in a traditional cheese in such quantity.

This among other things explains why the appearance of the yellow, cast cheese is not the same as the appearance of a traditional Gouda or Danbo cheese. Conventionally, there is no hole formation in a cast cheese and the color tends to be more grey. The ripening process does not proceed as fast as for corresponding traditionally produced cheeses, partly because the undenatured whey proteins are not decomposed and thus do not develop flavor components, and partly because of the slower decomposition of beta caseinate. A milder taste in ultrafiltration ripened cheese is, therefore, a well known phenomenon. Tests have shown that even Danbo and Hawarti cheeses produced from 4-6 times concentrated retentate followed by a whey drainage process have a milder taste than traditionally produced Danbo and Hawarti.

It is thus clear that the yellow, cast cheese produced by the process according to the invention has an even milder taste, as the yellow cast cheese has been produced on the basis of a 7.5-8 times concentrated ultrafiltration retentate. However, it should be emphasized that it is possible to obtain a nice, very mild and cheesy taste in a five week old yellow cast cheese. In close cooperation with Chr. Hansens Laboratorium, Denmark, it has been found that it is possible to increase the cheese taste of yellow cast cheese, if desired, by adding ripening enzymes developed by Chr. Hansens Laboratorium especially for yellow, cast cheese. The consistency of the yellow, cast cheese is also found to be acceptable. The consistency is smooth and at the same time sufficiently firm for the cheese to be sliced easily.

By the process according to the invention it is now possible to produce a semi-hard ripened cheese based on a technique where a complete concentration is carried out by means of ultrafiltration. With the development of the process according to the invention it is possible to produce a new type of semi-hard, ripened cheese with interesting cheese characteristics, while simultaneously obtaining an absolutely optimal cheese yield with the possibility of producing cheese of every uniform chemical composition and weight. By the process according to the invention it is possible to produce a very competitive cheese both as regards quality and price.

EXAMPLE 2

The present example describes the production of a cheese of the type 45+, i.e. having approx. 45% fat in relation to the dry matter content.

The raw milk is standardized to a fat content (fat %) of 1.0 times the protein % and pasteurized using a plate heat exchanger by heating to 72° C. for 15 seconds, whereupon it is cooled to 6° C. on a plate heat exchanger. The milk is then reheated to 50° C. on a plate heat exchanger and subjected to ultrafiltration in an ultrafiltration system (DDS plate and frame system, module 38 and module 37, available from Dow Danmark A/S, Nakskov, Denmark) with diafiltration to obtain a retentate having a dry matter content of 48-49% by weight and a lactose content of 1.1% by weight. The retentate is heated continuously to 69° C. for 20 seconds and then cooled to approx. 31° C. Rennet (standard rennet, rennetability 1:15,000, 20 ml per 100 kg retentate) and starter culture (20 g DVS B-11 and 20 g DVS R-603 per 100 kg. retentate) and $KNO_3$ (10 g per 100 kg retentate) are admixed in form of an aqueous suspension in volume of 1% of the volume of the retentate. After mixing the resulting product is automatically cast and the cheese is left to stand for 4 hours, whereupon it is demolded, subjected to acidification, left to stand for 10 hours followed by brine salting, whereupon the cheese is left to ripen. After a ripening period of five weeks, the cheese had a good consistency and a mild cheese taste.

EXAMPLE 3

The present example illustrates the production of a cheese of the type 20+.

The raw milk is standardized to a fat content whereby fat % = protein % times 0.27 and is pasteurized using plate heat exchanger by heating to 72° C. for 15 seconds, whereupon it is cooled to 6° C. The milk is then reheated to 50° C. on a plate heat exchanger and subjected to ultrafiltration in a DDS ultrafiltration apparatus of the plate and frame type with diafiltration to obtain a retentate having a dry matter content of 40-41% by weight and a lactose content of 1.6% by weight. The retentate is heated continuously to 65° C. for 30 seconds and then cooled to approx. 31° C. Rennet, starter culture and $KNO_3$ (as in Example 2) are admixed in form of an aqueous suspension in volume of 1% of the volume of the retentate. Mixing, casting and after-treatment are carrried out as described in Example 2. After ripening, the cheese has a satisfactory consistency and taste.

EXAMPLE 4

The present example illustrates the production of a cheese of the type 30+.

The raw milk is standardized to a fat content whereby fat % = protein % times 0.46 and is pasteurized using a plate heat exchanger by heating to 72° C. for 15 seconds, whereupon it is cooled to 50° C. on a plate heat exchanger and subjected to ultrafiltration in a DDS ultrafiltration apparatus of the plate and frame type with diafiltration to obtain a retentate having a dry matter content of 42-43% by weight and a lactose content of 1.4% by weight. The retentate is heated continuously to 65° C. for 30 seconds and then cooled to approx. 31° C. Rennet, starter culture and KNO$_3$ (as in Example 2) are admixed in form of a suspension in a volume of 1% of the volume of the retentate. The further treatment is carried out as described in Example 2. A good cheese both as regards consistency and taste is obtained.

EXAMPLE 5

The present example illustrates the production of a cheese of the type 50+.

The raw milk is standardized to a fat content of fat %=protein % times 1.25 and is pasteurized using a plate heat exchanger by heating to 72° C. for 15 seconds, whereupon it is cooled to 6° C. The milk is reheated to 50° C. on a plate heat exchanger and subjected to ultrafiltration in a DDS ultrafiltration apparatus of the plate and frame type with diafiltration to obtain a retentate having a dry matter content of 50–51% by weight and a lactose content of 1.0% by weight. The retentate is heated continuously to 69° C. for 20 seconds and then cooled to approx. 31° C. Rennet, starter culture and KNO$_3$ (as in Example 2) are admixed in form of a suspension in a volume of 1% of the volume of the retentate. The further treatment is carried out as described in Example 2. An attractive full-cream cheese both as regards consistency and taste is obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A process for production of cheese using milk or milk products as a starting material comprising the steps of:
    a) concentrating the starting material by membrane filtration to obtain a retentate with a dry matter content of x % by weight,
    where x is between $38 + \frac{1}{3}(y-20)$ and $44 + \frac{1}{3}(y-20)$ and where y is the fat content as a % by weight of the total dry matter;
    b) heating at 64°–70° C. for 10–40 seconds;
    c) cooling resulting retentate material to a temperature not higher than 40° C., and,
    d) dosing with rennet and starter culture, wherein the viscosity of the resulting retentate material is not more than 60,000 cP when starting the dosing.

2. The process of claim 1, further comprising the step of casting, wherein the dosing to the casting is carried out in 20–40 seconds.

3. The process of claim 1, wherein the process from the end of the concentrating step to the dosing is carried out under conditions such that the retentate and resulting material are in constant motion.

4. The process of claim 2, wherein the process from the end of the concentrating step to the casting is carried out continuously.

5. The process of claim 1, further comprising the steps of pasteurizing and cooling the starting material before the concentrating step.

6. The process of claim 1, further comprising the steps of mixing, casting, demolding, acidification, brine salting and curing.

7. The process of claim 1, further comprising the step of dosing with optional other additives selected from the group consisting of nitrate, calcium chloride, color, salt or ripening enzymes.

* * * * *